(12) United States Patent
Myeong et al.

(10) Patent No.: US 11,609,606 B2
(45) Date of Patent: Mar. 21, 2023

(54) DISPLAY APPARATUS

(71) Applicant: Samsung Display Co., LTD., Yongin-si (KR)

(72) Inventors: Man Sik Myeong, Seoul (KR); Heung Seok Go, Anyang-si (KR); Chang Min Park, Gwangmyeong-si (KR); Gil Jae Choi, Cheonan-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 29 days.

(21) Appl. No.: 17/012,210

(22) Filed: Sep. 4, 2020

(65) Prior Publication Data

US 2021/0109566 A1 Apr. 15, 2021

(30) Foreign Application Priority Data

Oct. 14, 2019 (KR) .................. 10-2019-0126832

(51) Int. Cl.
*G06F 1/16* (2006.01)
(52) U.S. Cl.
CPC .................... *G06F 1/1616* (2013.01)
(58) Field of Classification Search
CPC ......... G06F 1/1616; G06F 2203/04102; G06F 1/1652; G06F 1/1681
See application file for complete search history.

(56) References Cited

U.S. PATENT DOCUMENTS

| | | | | |
|---|---|---|---|---|
| 9,348,450 B1 * | 5/2016 | Kim | ........... | G06F 1/1681 |
| 9,470,404 B2 * | 10/2016 | Lee | ........... | F21V 21/30 |
| 9,826,626 B2 | 11/2017 | Myeong et al. | | |
| 10,198,041 B2 | 2/2019 | Myeong et al. | | |
| 10,551,880 B1 * | 2/2020 | Ai | ........... | H04M 1/0216 |
| 2012/0307423 A1 * | 12/2012 | Bohn | ........... | G06F 1/1652 |
| | | | | 361/679.01 |
| 2013/0037228 A1 | 2/2013 | Verschoor et al. | | |
| 2015/0201487 A1 * | 7/2015 | Kee | ........... | G02F 1/133305 |
| | | | | 361/749 |
| 2015/0366089 A1 * | 12/2015 | Park | ........... | H04M 1/022 |
| | | | | 361/679.01 |
| 2016/0085265 A1 * | 3/2016 | Park | ........... | G06F 1/1616 |
| | | | | 361/807 |
| 2016/0135324 A1 * | 5/2016 | Lee | ........... | G06F 1/1652 |
| | | | | 248/346.01 |
| 2016/0150657 A1 * | 5/2016 | Myeong | ........... | G06F 1/1616 |
| | | | | 361/749 |

(Continued)

FOREIGN PATENT DOCUMENTS

| | | |
|---|---|---|
| KR | 1020190092657 A | 8/2019 |
| KR | 1020190132604 A | 11/2019 |

*Primary Examiner* — Abhishek M Rathod
(74) *Attorney, Agent, or Firm* — Cantor Colburn LLP

(57) ABSTRACT

A display apparatus includes a display panel which is foldable at a folding area thereof; a foldable support which faces the display panel and is foldable together with the display panel; an elastic sheet between the foldable support and the display panel; a lower adhesive layer which is between the foldable support and the elastic sheet, and attaches the foldable support to the elastic sheet; and an upper adhesive layer which is between the elastic sheet and the display panel and attaches the elastic sheet to the display panel. Each of the foldable support, the elastic sheet, the lower adhesive layer and the upper adhesive layer is disconnected at the folding area.

14 Claims, 5 Drawing Sheets

(56) References Cited

U.S. PATENT DOCUMENTS

| | | | |
|---|---|---|---|
| 2016/0209874 A1* | 7/2016 | Choi | G06F 1/1641 |
| 2016/0378203 A1* | 12/2016 | Kim | G06F 1/1675 345/156 |
| 2017/0135197 A1* | 5/2017 | Huitema | H05K 1/0271 |
| 2018/0248150 A1* | 8/2018 | Oh | H01L 51/5281 |
| 2019/0305238 A1 | 10/2019 | Shin et al. | |
| 2019/0334114 A1* | 10/2019 | Park | H01L 51/0097 |
| 2020/0204666 A1* | 6/2020 | Hong | H04M 1/0216 |
| 2020/0260596 A1* | 8/2020 | Park | H01L 51/5246 |

\* cited by examiner

DISPLAY APPARATUS

This application claims priority to Korean Patent Application No. 10-2019-0126832 filed on Oct. 14, 2019, and all the benefits accruing therefrom under 35 U.S.C. § 119, the entire disclosure of which is incorporated herein by reference.

BACKGROUND

1. Field

Embodiments relate generally to a display apparatus. More particularly, embodiments relate to an in-folding type foldable display apparatus.

2. Description of the Related Art

A foldable display apparatus, which uses a flexible display panel that is bendable, has been developed. Since the display apparatus which is foldable can facilitate portability when folded and can implement a large screen when unfolded, the display apparatus may be applied to various fields for mobile devices such as mobile phones, ultra-mobile personal computers ("PCs"), electronic books and electronic newspapers as well as televisions, display monitors and the like.

The display apparatus may include a folding area disposed between non-folding areas spaced apart from each other. When the display apparatus is folded, a bent shape of the folding area may determine an overall volume or design of the display apparatus in the folded state thereof. Particularly, the bent shape of the folding area relates to an occurrence of wrinkles that spoil aesthetics of the folding area, in an unfolded state of the display apparatus. Accordingly, there have been demands for a foldable display apparatus having improved design and quality.

SUMMARY

One or more embodiment provides a foldable display apparatus having improved quality.

According to an embodiment, a display apparatus includes a display panel which is foldable at a folding area thereof, a foldable support which faces the display panel and is foldable together with the display panel; an elastic sheet between the foldable support and the display panel; a lower adhesive layer which is between the foldable support and the elastic sheet, and attaches the foldable support to the elastic sheet; and an upper adhesive layer which is between the elastic sheet and the display panel and attaches the elastic sheet to the display panel. Each of the foldable support, the elastic sheet, the lower adhesive layer and the upper adhesive layer is disconnected at the folding area.

In an embodiment, a width of a lower unattached area in which the elastic sheet and the foldable support are not bonded to each other, may be greater than a width of an upper unattached area in which the elastic sheet and the display panel are not bonded to each other.

In an embodiment, the upper unattached area may exclude the upper adhesive layer.

In an embodiment, the display apparatus may further include a step compensation layer disposed between the display panel and the elastic sheet, in the upper unattached area.

In an embodiment, an adhesive strength (or adhesive force) of a planar area of a surface of the upper adhesive layer which contacts the display panel, may be weaker than an adhesive strength of remaining portions of the surface of the upper adhesive layer, in the upper unattached area.

In an embodiment, the foldable support which is disconnected, may include a first support and a second support spaced apart from each other along the display panel, at the folding area, the display panel which is unfolded may dispose the first support and the second support coplanar with each other, and the display panel which is folded may dispose the first support and the second support facing each other.

In an embodiment, the display panel may include a first non-folding area corresponding to the first support, a second non-folding area corresponding to the second support, and a folding area between the first non-folding area and the second non-folding area. In addition, the foldable support which is folded together with the display panel, may dispose the display panel bent at the folding area.

In an embodiment, the elastic sheet which is disconnected, may include a first elastic sheet corresponding to the first non-folding area, and a second elastic sheet corresponding to the second non-folding area and spaced apart from the first elastic sheet along the display panel, at the folding area, the first elastic sheet may include a first portion corresponding to the folding area and a second portion which is adjacent to the first portion and corresponding to the first non-folding area, and the foldable support which is folded together with the display panel, may dispose the first portion of the first elastic sheet inclined with respect to the second portion of the first elastic sheet.

In an embodiment, the display panel which is unfolded, may define a space between the foldable support and the elastic sheet, in the lower unattached area.

In an embodiment, the foldable support may include a first support which faces the display panel and is foldable together with the display panel, the first support facing the elastic sheet with the space therebetween, and a second support in the space between the first support and the elastic sheet, the second support rotatably connected to the first support to rotate within an angle with respect to the first support.

In an embodiment, the elastic sheet may be attached to the foldable support at the second support.

In an embodiment, the display panel may include a first non-folding area, a second non-folding area, the folding area between the first non-folding area and the second non-folding area and at the folding area, an upper unattached area in which the elastic sheet and the display panel are unattached to each other, the upper unattached area having a width defined along the display panel. In addition, the foldable support which is folded together with the display panel, may define a radius of curvature of the display panel at the folding area, and the width of the upper unattached area may be about 10 times or less of the radius of curvature of the display panel.

In an embodiment, the foldable support may further include a central support disposed between the first support and the second support. The display panel which unfolded, may dispose a first elastic sheet and a second elastic sheet extended further than a side surface of the first support and the second support, respectively, at the folding area, and the first elastic sheet and the second elastic sheet which are extended further than the side surface of the first support and the second support, respectively, may define ends of the elastic sheet at the folding area which correspond to the central support.

In an embodiment, the elastic sheet may have an elastic modulus between about 5 gigapascals (GPa) and about 300 GPa.

In an embodiment, the elastic sheet may include a metal sheet having a thickness between about 30 micrometers (μm) and about 200 μm.

According to an embodiment, a display apparatus includes an elastic sheet which is foldable and has an elastic modulus between about 5 gigapascals and about 300 gigapascals; and a display panel facing the elastic sheet which has the elastic modulus between about 5 GPa and about 300 GPa, and is foldable together with the elastic sheet.

In an embodiment, the display apparatus may further include an upper adhesive layer which is between the elastic sheet and the display panel and attaches the elastic sheet to the display panel.

In an embodiment, the display panel may include a first non-folding area, a second non-folding area, a folding area between the first non-folding area and the second non-folding area and an upper unattached area in which the display panel and the elastic sheet are not bonded to each other, in the folding area.

In an embodiment, the display apparatus may further include a foldable support facing the display panel with the elastic sheet and the upper adhesive layer therebetween, the foldable support being foldable together with the display panel and the elastic sheet, and a lower adhesive layer which is between the foldable support and the elastic sheet and attaches the foldable support to the elastic sheet. The display panel which is unfolded, may dispose each of the elastic layer, the upper adhesive layer, the foldable support and the lower adhesive layer disconnected at the folding area.

In an embodiment, the foldable support which is unfolded together with the display panel, may define the upper unattached area having a width along the display panel, the foldable support which is folded together with the display panel, may define a radius of curvature of the display panel at the folding area, and the width of the upper unattached area may be about 10 times or less of the radius of curvature of the display panel.

Therefore, one or more embodiment of a display apparatus may include an elastic sheet and a flexible display panel which faces the elastic sheet. A rapidly deformed portion of the flexible display panel may be reduced by the elastic sheet, thereby minimizing or reducing an area in which wrinkles occur in the flexible display panel due to repeated folding and unfolding thereof. As a result, visual recognition of the wrinkles from outside the display apparatus may be reduced or effectively prevented.

BRIEF DESCRIPTION OF THE DRAWINGS

Illustrative, non-limiting embodiments will be more clearly understood from the following detailed description in conjunction with the accompanying drawings.

DETAILED DESCRIPTION

Figure 1:
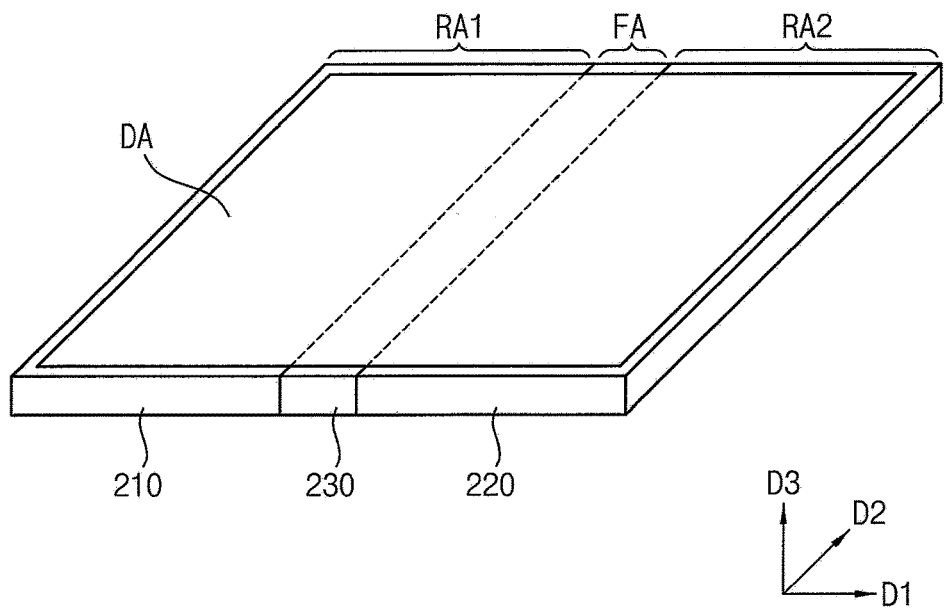
FIG. 1 is a schematic perspective diagram illustrating an embodiment of a display apparatus.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being related to another element such as being "on" another element, it can be directly on the other element or intervening elements may be present therebetween. In contrast, when an element is referred to as being related to another element such as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/ or components, but do not preclude the presence or addition of one or more other features, regions, integers, steps, operations, elements, components, and/or groups thereof section without departing from the teachings herein.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within 30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be explained in detail with reference to the accompanying drawings.

Figure 2:
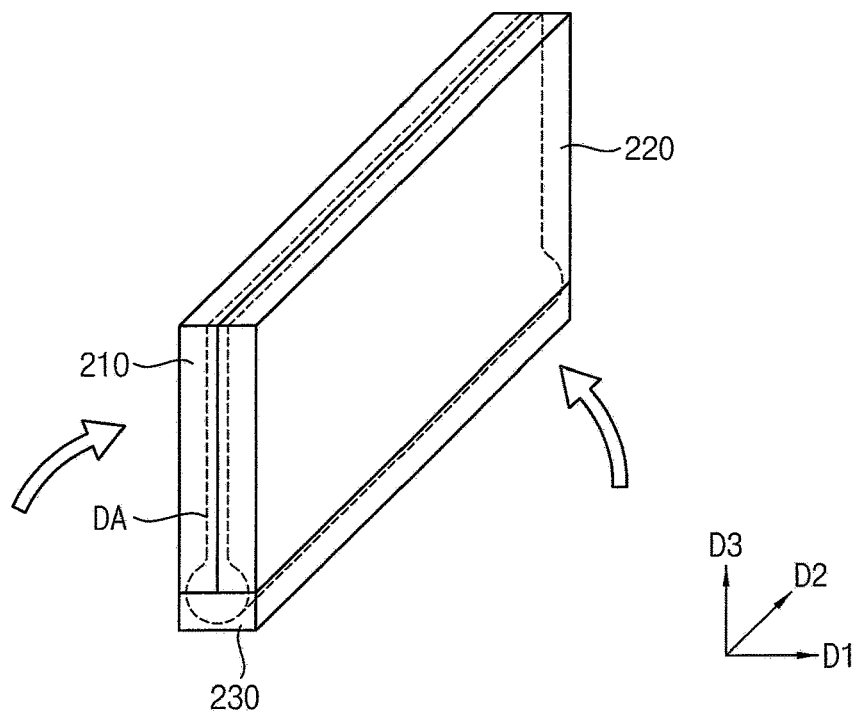
FIG. 2 is a schematic perspective diagram illustrating an embodiment of the display apparatus of FIG. 1, which is folded.

FIG. 1 is a schematic perspective diagram illustrating an embodiment of a display apparatus which is unfolded, and FIG. 2 is a schematic perspective diagram illustrating of an embodiment of the display apparatus of FIG. 1 which is folded.

Referring to FIGS. 1 and 2, the display apparatus may include a foldable support including a first support 210, a second support 220 and a central support 230 (e.g., a third support), and a display panel DP which is flexible and supported by the foldable support. The display apparatus may be a foldable display apparatus that is foldable and unfoldable at a display area DA.

The display apparatus may include a first non-folding area RA1, a second non-folding area RA2 spaced apart from and the first non-folding area RA1 along a first direction D1, and a folding area FA disposed between the first non-folding area RA1 and the second non-folding area RA2. A length of the folding area FA may extend along a second direction D2 which crosses the first direction D1. In an embodiment, the first direction D1 may be perpendicular to the second direction D2, without being limited thereto. Components of the display apparatus may include a first non-folding area RA1, a second non-folding area RA2 and a folding area FA corresponding to those described above for the display apparatus.

The display area DA is a planar area at which an image is displayed, light is emitted, etc. The display area DA may be disposed at a front surface or display surface of the display apparatus, at a viewing side thereof. The front surface may include the display area DA and a non-display area (not shown) which is adjacent to the display area DA, such as surrounding the display area DA in the top plan view. The display area DA may be disposed in each of the first non-folding area RA1, the folding area FA and the second non-folding area RA2.

According to one or more embodiment of the display apparatus, the display apparatus may be foldable at the folding area FA, to be bent (e.g., folded) and unbent (e.g., unfolded). An in-folding type foldable display apparatus may be implemented in which portions of the front surface or display surface face each other. The display apparatus may be non-foldable or may remain flat at the first non-folding area RA1 and the second non-folding area RA2.

Referring to FIG. 1 the display area DA and each of the first non-folding area RA1 and the second non-folding area RA2 are disposed in a plane defined by the first direction D1 and the second direction D2 (e.g., coplanar with each other), for the display apparatus which is unfolded. Referring to FIG. 2, that the first non-folding area RA1 and the second non-folding area RA2 are disposed in planes which are parallel with a plane defined by the second direction D2 and a third direction D3 which crosses each of the first direction D1 and the second direction D2, for the display apparatus which is folded. In an embodiment, the third direction D3 may be perpendicular to each of the first direction D1 and the second direction D2, without being limited thereto. A thickness or thickness direction of the display apparatus and/or components thereof, may be defined along the third direction D3.

Figure 3:
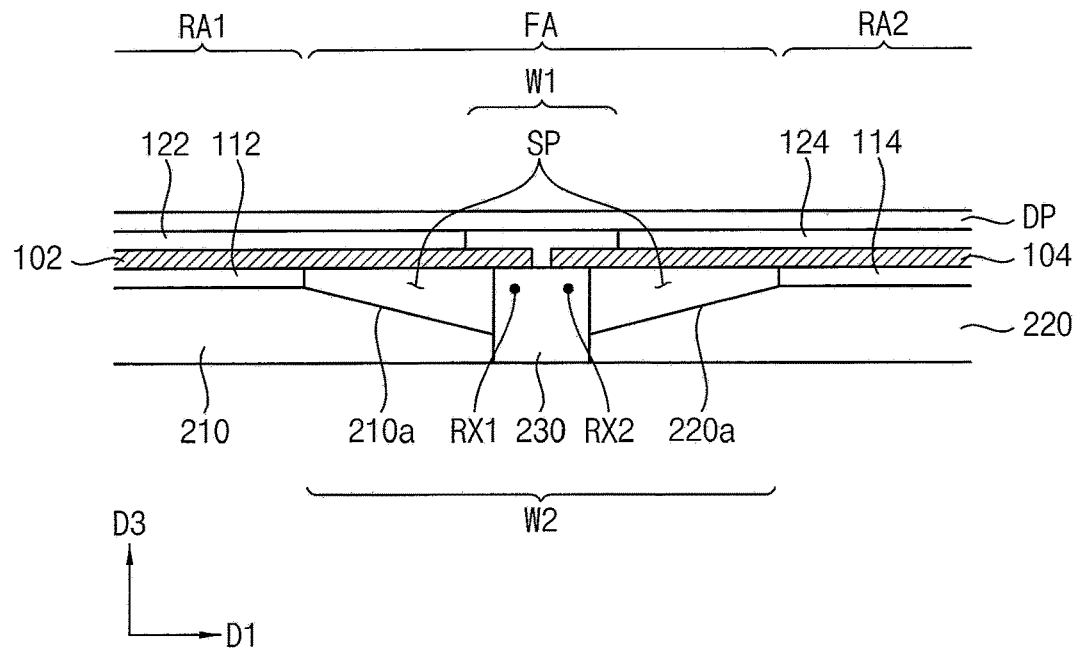
FIG. 3 is an enlarged cross-sectional view illustrating an embodiment of a folding area and an area adjacent thereto, in the display apparatus of FIG. 1 which is unfolded.
Figure 4:
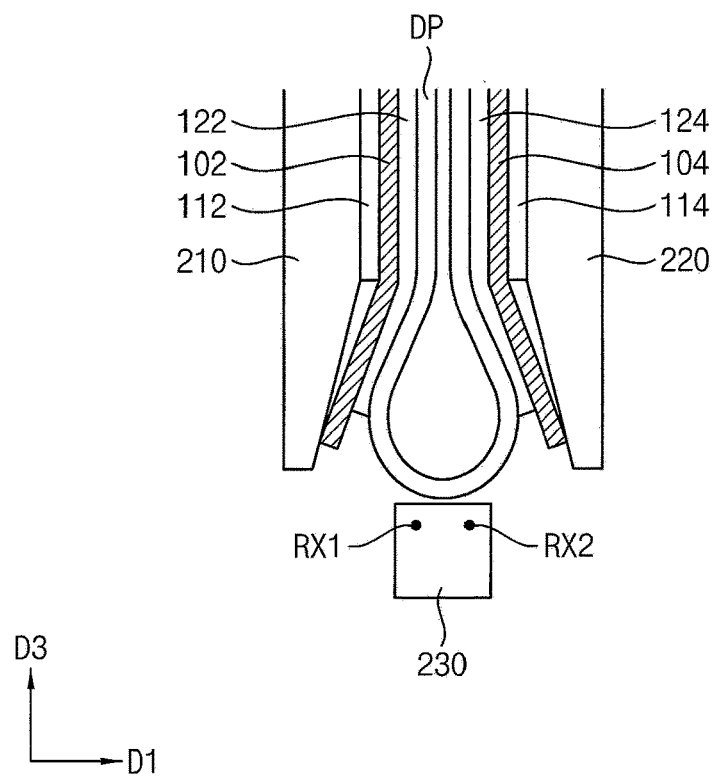
FIG. 4 is an enlarged cross-sectional view illustrating an embodiment of a folding area and an area adjacent thereto, in the display apparatus of FIG. 3 which is folded.

FIG. 3 is an enlarged cross-sectional view illustrating an embodiment of a folding area FA and an area adjacent thereto, in the display apparatus of FIG. 1 which is unfolded, and FIG. 4 is an enlarged cross-sectional view illustrating an embodiment of a folding area FA and an area adjacent thereto, in the display apparatus of FIG. 3, which is folded. FIG. 3 is a view of an end portion of the display apparatus, at which the folding area FA is bent.

Referring to FIGS. 3 and 4, the display apparatus may include a foldable support, a first lower adhesive layer 112, a second lower adhesive layer 114, a first elastic sheet 102 (e.g., first elastic layer), a second elastic sheet 104 (e.g., second elastic layer), a first upper adhesive layer 122, a second upper adhesive layer 124, and a display panel DP which is flexible.

The foldable support may include a first support 210, a second support 220 and a central support 230. The foldable support is disconnected at the folding area FA.

The display panel DP may be foldable to dispose the first support 210 and the second support 220 facing, and may be unfoldable to dispose the first support 210 and the second support 220 in planes which are parallel to each other (e.g., coplanar with each other). In an embodiment, for example, the first support 210 may be rotatable about a first rotation axis RX1, and the second support 220 may be rotatable about a second rotation axis RX2. That is, the first support 210 is rotatable relative to the central support 230, about the first rotation axis RX1, and the second support 220 is rotatable relative to the central support 230, about the second rotation axis RX2.

The display apparatus which is flat or unfolded, disposes the foldable support flat or unfolded. The foldable support which is flat or unfolded, disposes the central support 230 between the first support 210 and the second support 220 along the first direction D1, and may support ends of the first elastic sheet 102 and the second elastic sheet 104. The foldable support which is flat or unfolded, disposes ends of the first elastic sheet 102 and the second elastic sheet 104 spaced apart from each other at the folding area FA. The ends define side surfaces of the first elastic sheet 102 and the second elastic sheet 104 which face each other at the folding area FA. Referring to FIG. 3, for example, the display panel DP which unfolded, disposes the first elastic sheet 102 and the second elastic sheet 104 extended further than a side surface of the first support 210 and the second support 220, respectively, at the folding area FA. The first elastic sheet 102 and the second elastic sheet 104 which are extended further than the side surface of the first support 210 and the second support 220, respectively, define ends of a collective elastic sheet at the folding area FA, which correspond to the central support 230.

Although the foldable support is illustrated relative to a two-axis hinge (e.g., the first rotation axis RX1 and the second rotation axis RX2), the invention is not limited thereto. In an embodiment, for example, the foldable support may have a one-axis hinged structure.

The first elastic sheet 102 may be disposed on and corresponding to the first support 210. The second elastic sheet 104 may be disposed on and corresponding to the second support 220 and may be spaced apart from the first elastic sheet 102. The first elastic sheet 102 and the second elastic sheet 104 may support the folding area FA of the display panel DP which is unfolded. Accordingly, the display panel DP which is flat or unfolded, disposes each of the first elastic sheet 102 and the second elastic sheet 104 flat or unfolded, to support the folding area FA of the display panel DP. The first elastic sheet 102 and the second elastic sheet 104 may form a gap relative to the display panel DP, for allowing the display panel DP to be bent within the display apparatus which is folded.

The first elastic sheet 102 may include a material and a thickness that can reduce or effectively prevent a creep deformation from occurring, even after repeated folding and unfolding of the display apparatus and/or display panel DP In an embodiment, for example, an elastic modulus of the first elastic sheet 102 and the second elastic sheet 104 may be between about 5 gigapascals (GPa) and about 300 GPa. The first elastic sheet 102 and the second elastic sheet 104 may include a metal material (e.g., a metal sheet) and may have a thickness between about 30 micrometers (μm) and about 200 μm. In an embodiment, for example, the metal sheet may include stainless steel (SUS) or aluminum.

The first elastic sheet 102 and the second elastic sheet 104 may reduce or effectively prevent a bending deformation of the folding area FA of the display panel DP from increasing. The first elastic sheet 102 and the second elastic sheet 104 may together define a elastic sheet which is collectively between the first support 210 and the display panel DP and between the second support 220 and the display panel DP, the elastic sheet being disconnected at the folding area FA.

Referring to FIGS. 3 and 4, the first elastic sheet 102 includes a first portion corresponding to the folding area FA and a second portion which is adjacent to the first portion and corresponding to the first non-folding area RA1. The foldable support which is folded together with the display panel DP (FIG. 4), disposes the first portion of the first elastic sheet 102 inclined with respect to the second portion of the first elastic sheet 102. Similar description may be applied to the second elastic sheet 104 shown in FIG. 4.

In the display panel DP which is folded, the first non-folding area RA1 and the second non-folding area RA2 may be positioned to face each other, and the folding area FA of the display panel DP which is folded may be bent to have a water droplet shape as shown in FIG. 4. Due to the first elastic sheet 102 and the second elastic sheet 104, a length of a section of the display apparatus in which the deformation of the display panel DP occurs, may be reduced as compared to a display apparatus which omits the first elastic sheet 102 and the second elastic sheet 104. In other words, due to the first elastic sheet 102 and the second elastic sheet 104, a portion of a display apparatus in which the display panel DP is deformed may be reduced to a portion at an upper unattached area corresponding to a first width W1 (FIG. 3), as compared to the display apparatus which omits the first elastic sheet 102 and the second elastic sheet 104, for which the deformed portion of the display panel DP would correspond to a secondary width. Accordingly, a planar area of the display panel DP which has wrinkles due to repeated folding and unfolding of the display panel DP may be minimized, so the wrinkles being visually recognizable from outside the display apparatus may be avoided.

The first lower adhesive layer 112 may be disposed between the first support 210 and the first elastic sheet 102. That is, the first support 210 may face the first elastic sheet 102 with the first lower adhesive layer 112 therebetween. The second lower adhesive layer 114 may be disposed between the second support 220 and the second elastic sheet 104. That is, the second support 220 may face the second elastic sheet 104 with the second lower adhesive layer 114 therebetween. The first lower adhesive layer 112 and the second lower adhesive layer 114 may bond the first elastic sheet 102 and the second elastic sheet 104 to the first support 210 and the second support 220, respectively. The first lower adhesive layer 112 and the second lower adhesive layer 114 may together define a lower adhesive layer which is collectively between the elastic sheet and the foldable support, the lower adhesive layer being disconnected at the folding area FA. In an embodiment, for example, the first lower adhesive layer 112 and the second lower adhesive layer 114 may include be formed of an adhesive such as acrylic-based resin or silicone-based resin or a pressure sensitive adhesive ("PSA").

The display panel DP which is flexible may be disposed on and corresponding to both the first elastic sheet 102 and the second elastic sheet 104. The display panel DP may include a light emitting structure for generating a light and/or emitting a light for displaying an image, and may be an organic light emitting display panel which is flexible. A laminated structure of the light emitting structure and the like within the display panel DP which is flexible will be described with reference to FIG. 9.

The first upper adhesive layer 122 may be disposed between the display panel DP and the first elastic sheet 102. The second upper adhesive layer 124 may be disposed between the display panel DP and the second elastic sheet 104. That is, the first elastic sheet 102 and the second elastic sheet 104 each face the display panel DP, with the first upper adhesive layer 122 and the second upper adhesive layer 124 therebetween respectively. The first upper adhesive layer 122 and the second upper adhesive layer 124 may respectively bond the first elastic sheet 102 and the second elastic sheet 104 to the display panel DP. The first upper adhesive layer 122 and the second upper adhesive layer 124 may together define an upper adhesive layer which is collectively between the elastic sheet and the display panel DP, the upper adhesive layer being disconnected at the folding area FA. In an embodiment, for example, the first upper adhesive layer 122 and the second upper adhesive layer 124 may include or be formed of an adhesive such as acrylic-based resin or silicone-based resin or a pressure sensitive adhesive ("PSA").

The first upper adhesive layer 122 and the second upper adhesive layer 124 may be spaced apart from each other, to form an upper unattached area in which the upper a first upper adhesive layer 122 and the second upper adhesive layer 124 are omitted. That is, the upper unattached area excludes the upper adhesive layer. The upper unattached area may be defined in the folding area FA, and include a planar area of the display panel DP at which the first upper adhesive layer 122 and the second upper adhesive layer 124 are omitted. The upper unattached area may include a total planar area of the first elastic sheet 102 and the second elastic sheet 104 at which the first upper adhesive layer 122 and the second upper adhesive layer 124 are omitted.

The display panel DP which is folded defines a radius of curvature at the folding area FA, at an end portion of the display panel DP (refer to FIG. 4). The upper unattached area may have a first width W1 (FIG. 3) taken in a direction along the display panel DP (e.g., first direction D1 in FIG. 3). The first width W1 may be equal to or less than about 10 times the radius of curvature of the display panel DP which is folded. In an embodiment, for example, when the radius of curvature is about 2.5 μm, the first width W1 may be about 15 μm. In an embodiment, for example, when the radius of curvature is about 1.5 μm, the first width W1 may be about 9.5 μm.

The first lower adhesive layer 112 and the second lower adhesive layer 114 may be spaced apart from each other to form an upper unattached area in which the first lower adhesive layer 112 and the second lower adhesive layer 114 are omitted. A lower unattached area may have a second width W2. The second width W2 is greater than the first width W1.

In the display apparatus which is unfolded, a space SP provided in plurality (e.g., spaces SP) may be provided or formed between the first support 210 and the first elastic sheet 102, and between the second support 220 and the second elastic sheet 104, respectively, at the lower unattached area. The spaces SP may be provided or formed by a first inclined surface 210a of the first support 210 and a second inclined surface 220a of the second support 220, together with side surfaces of the central support 230, the first lower adhesive layer 112 and the second lower adhesive layer 114, but the spaces SP are not limited thereto. In an embodiment, for example, the spaces SP may be provided or formed in a stepped shape instead of the first inclined surface 210a and the second inclined surface 220a. That is, a shape of the first support 210 and the second support 220 may define a shape of the spaces SP, without being limited thereto.

In the display apparatus which is folded, the folding area FA of the first elastic sheet 102, the second elastic sheet 104 and the display panel DP may be bent to define a curvature in the spaces SP.

Although not shown, a cushion layer including or formed of a foam material, may be disposed between the display panel DP, and each of the first elastic sheet 102 and the second elastic sheet 104, respectively, or between the first elastic sheet 102 and the second elastic sheet 104 and the first support 210 and the second support 220, respectively.

Although not shown, a cover window which is transparent may be provided on an outer side of a display surface (an upper surface in FIG. 3) of the display panel DP The cover window may protect the display panel DP from external impacts, scratches or the like, while forming an outer surface of the display apparatus. An image generated by the display panel DP is transmittable through the cover window to outside the display apparatus. In addition, although not shown, the display apparatus may further include a touch screen panel which detects an input (e.g., touch action, object in proximity, etc.), between the display panel DP and the cover window.

Figure 5:
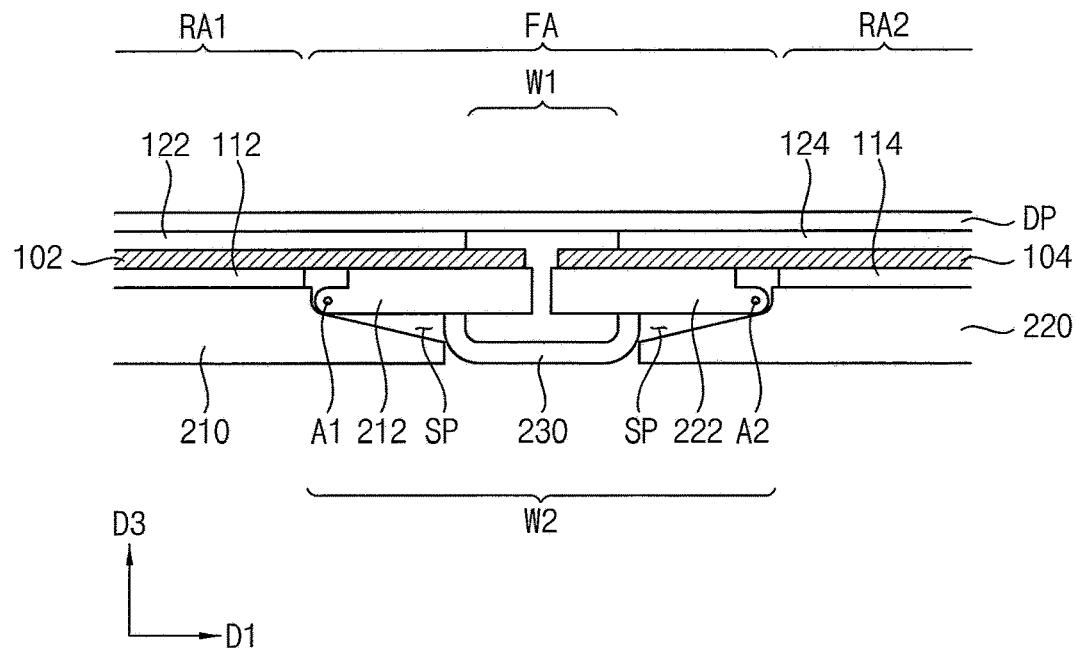
FIG. 5 is an enlarged cross-sectional view illustrating an embodiment of a folding area and an area adjacent thereto, in a display apparatus which is unfolded.
Figure 6:
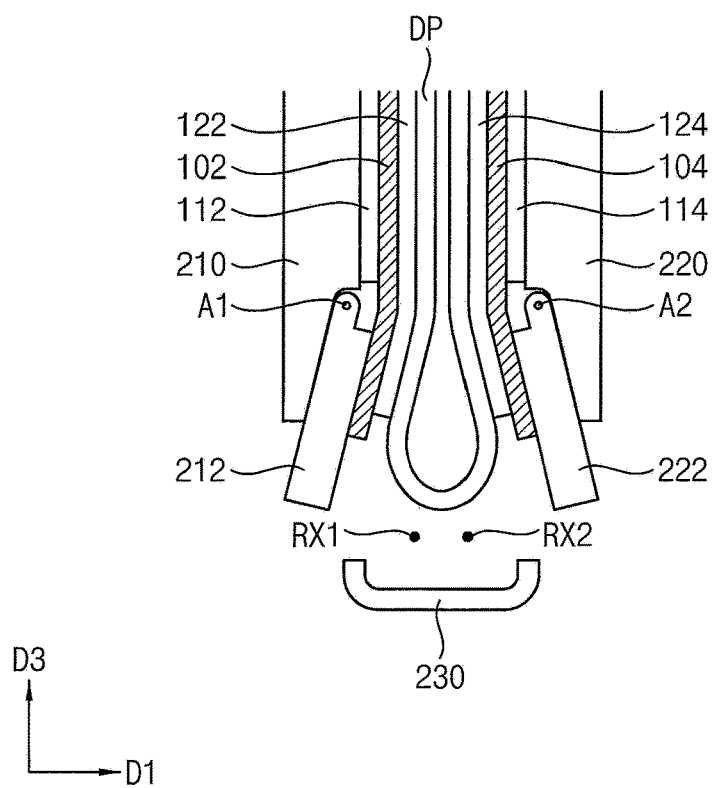
FIG. 6 is an enlarged cross-sectional view illustrating an embodiment of a folding area and an area adjacent thereto, in the display apparatus of FIG. 5 which is folded.

FIG. 5 is an enlarged cross-sectional view illustrating an embodiment of a folding area FA and an area adjacent thereto, in a display apparatus which is unfolded, and FIG. 6 is an enlarged cross-sectional view illustrating an embodiment of a folding area FA and an area adjacent thereto, in the display apparatus of FIG. 5 which is folded. FIG. 6 is a view of an end portion of the display apparatus, at which the folding area FA is bent.

Referring to FIG. 5, the display apparatus is substantially the same as the display apparatuses of FIGS. 3 and 4, except for a first rotary support 212 and a second rotary support 122 respectively connected to a central support 230. Therefore, duplicate descriptions related thereto will not be repeated.

The display apparatus may include a first support 210, a second support 220, a central support 230, a first lower adhesive layer 112, a second lower adhesive layer 114, a first elastic sheet 102, a second elastic sheet 104, a first upper adhesive layer 122, a second upper adhesive layer 124 and a display panel DP which is flexible.

The first rotary support 212 and the second rotary support 222 may be disposed in a space SP between the first support 210 and the first elastic sheet 102 and a space SP between the second support 220 and the second elastic sheet 104, respectively.

The first rotary support 212 may be rotatably connected to the first support 210, to rotate within an angle with respect to the first support 210. In an embodiment, for example, the first rotary support 212 may rotate within the angle, about a first axis A1 defined in the space SP.

The second rotary support 222 may be rotatably connected to the second support 220 to rotate within an angle with respect to the second support 220. In an embodiment, for example, the second rotary support 222 may rotate within the angle, about a second axis A2 defined in the space SP.

In the display apparatus which is folded, the first rotary support 212 and the second rotary support 222 may be rotated together with the first support 210 and the second support 220, respectively, such as by using an elastic member (not shown) or the like. Accordingly, in the display apparatus which is folded, spaces SP between the foldable support and the display panel DP, which allows the display panel DP to be bendable, may be provided or formed due to rotations of the first rotary support 212 and the second rotary support 222. The elastic sheet (e.g., a collection of the first elastic sheet 102 and the second elastic sheet 104) is attached to the foldable support at the first rotary support 212 and the second rotary support 222 (e.g., as a secondary support to the primary support of the first support 210 together with the second support 220).

The display apparatus which is unfolded, disposes the central support 230 facing the display panel DP with the first rotary support 212 and the second rotary support 222 therebetween such that the central support 230 may support the first rotary support 212 and the second rotary support 222 thereon. The display apparatus which is unfolded disposes the first elastic sheet 102 and the second elastic sheet 104 corresponding to the first rotary support 212 and the second rotary support 222, in planes which are parallel to each other (e.g., to be coplanar with each other). Within the display apparatus which is unfolded, the first support 210, the second support and the central support 230 relative to each other, the first rotary support 212 and the second rotary support 222 relative to each other, the first lower adhesive layer 112 and the second lower adhesive layer 114 relative to each other, the first elastic sheet 102 and the second elastic sheet 104 relative to each other, and the first upper adhesive layer 122 and the second upper adhesive layer 124 relative to each other, may be coplanar, without being limited thereto.

Figure 7:
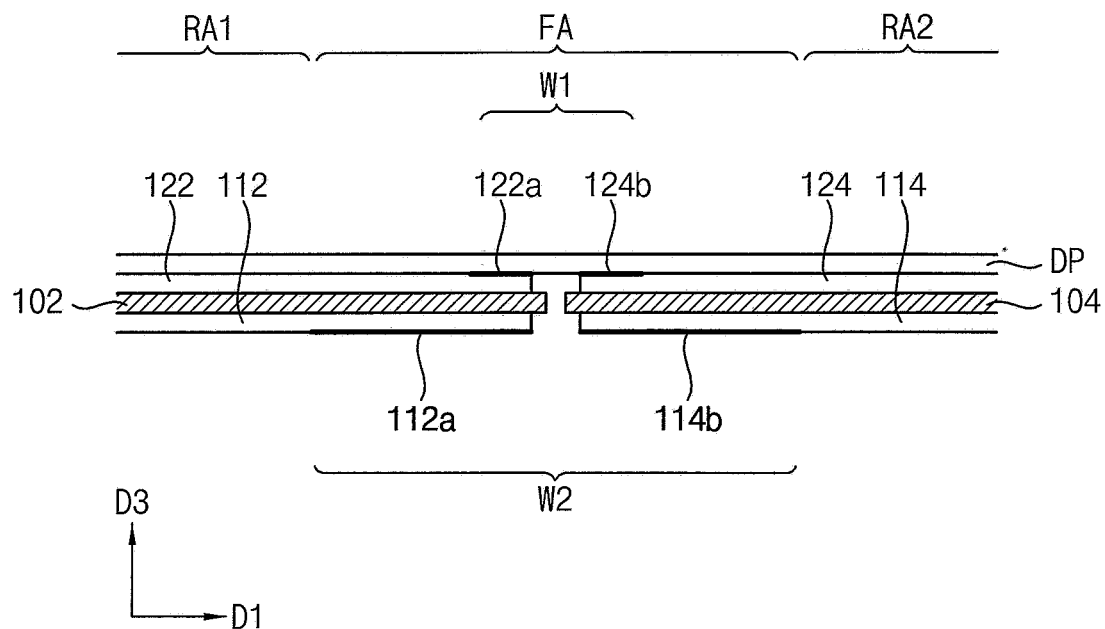
FIG. 7 is an enlarged cross-sectional view illustrating an embodiment of a folding area and an area adjacent thereto, in a display apparatus which is unfolded.

FIG. 7 is an enlarged cross-sectional view illustrating an embodiment of a folding area FA and an area adjacent thereto, in a display apparatus which is unfolded.

Referring to FIG. 7, the display apparatus is substantially the same as the display apparatuses of FIGS. 3 and 4, except for the upper and lower unattached areas. Although not shown, the display apparatus may further include a foldable support (see the first support 210, the second support 220 and the central support 230 of FIGS. 1 through 6).

The display apparatus may include a first lower adhesive layer 112, a second lower adhesive layer 114, a first elastic sheet 102, a second elastic sheet 104, a first upper adhesive layer 122, a second upper adhesive layer 124 and a display panel DP which is flexible.

A lower unattached area, in which the first elastic sheet 102 and the first support 210 are not bonded to each other, may be provided or formed. In an embodiment, for example, the lower unattached area may be provided or formed by defining a first lower unattached planar area 112a as a partial planar area of a lower surface of the first lower adhesive layer 112, such as through a surface-processing or the like. Although not shown, in another embodiment, the lower unattached planar area also may be provided or formed by surface-processing a partial area of an upper surface of the first lower adhesive layer 112.

In an embodiment, for example, when the first lower adhesive layer 112 is a pressure sensitive adhesive sheet including an ultraviolet ("UV") reactant, the first lower unattached planar area 112a having an adhesive strength weaker than an adhesive strength of other portions of the first lower adhesive layer 112 may be provided or formed by irradiating ultraviolet rays to a portion of the first lower adhesive layer 112 corresponding to the first lower unattached planar area 112a of the first lower adhesive layer 112. In another embodiment, the first lower unattached planar area 112a may be provided or formed by a silicone processing when the first lower adhesive layer 112 includes an acrylic-based adhesive and may be provided or formed by an acrylic processing when the first lower adhesive layer 112 includes a silicone-based adhesive.

Similarly, a lower unattached area may also be provided or formed in the second lower adhesive layer 114. In an embodiment, for example, a second lower unattached planar area 114b may be provided formed on a partial planar area of a lower surface of the second lower adhesive layer 114, such as through a surface-processing or the like. The first lower unattached planar area 112a and the second lower unattached planar area 114b may each have an adhesive strength weaker than an adhesive strength of remaining portions of the first lower adhesive layer 112 and the second lower adhesive layer 114, respectively. That is, the first lower adhesive layer 112 and the second lower adhesive layer 114 are detachable from the foldable support at the lower unattached planar areas thereof, such that the display panel DP is detached relative to the foldable support at such planar areas.

An upper unattached area, in which the first elastic sheet 102 and the display panel DP are not bonded to each other, may be provided or formed. In an embodiment, for example, the upper unattached area may be provided or formed by defining a first upper unattached planar area 122a on a partial planar area of an upper surface of the first upper adhesive layer 122, such as through a surface-processing or the like. Although not shown, in another embodiment, the upper unattached area may also be defined by surface-processing a partial planar area of a lower surface of the first upper adhesive layer 122.

Similarly, an upper unattached area may also be provided or formed in the second upper adhesive layer 124. In an embodiment, for example, a second upper unattached planar area 124b may be provided or formed on a partial planar area of the upper surface of the second upper adhesive layer 124, such as through a surface-processing or the like. Although not shown, in another embodiment, the upper unattached area may also be defined by surface-processing a partial planar area of a lower surface of the second upper adhesive layer 124. The first upper unattached planar area 122a and the second upper unattached planar area 124b may each have an adhesive strength weaker than an adhesive strength of remaining portions of the first upper adhesive layer 122 and the second upper adhesive layer 124, respectively. That is, the display panel DP is respectively detachable from the first upper adhesive layer 122 and the second upper adhesive layer 124 at the upper unattached planar areas thereof, such that the display panel DP is foldable at the folding area FA. The remaining portions of the first upper adhesive layer 122 and the second upper adhesive layer 124 may include an attached planar area which is adjacent to the first upper unattached planar area 122a and the second upper unattached planar area 124b and attached to the display panel DP.

According to one or more embodiment, since the unattached area (e.g., lower and/or upper) is provided or formed by surface-processing one or more of the adhesive layers at the folding area FA thereof, a step difference due to the adhesive layers relative to other layers within the display apparatus may be minimized.

Figure 8:
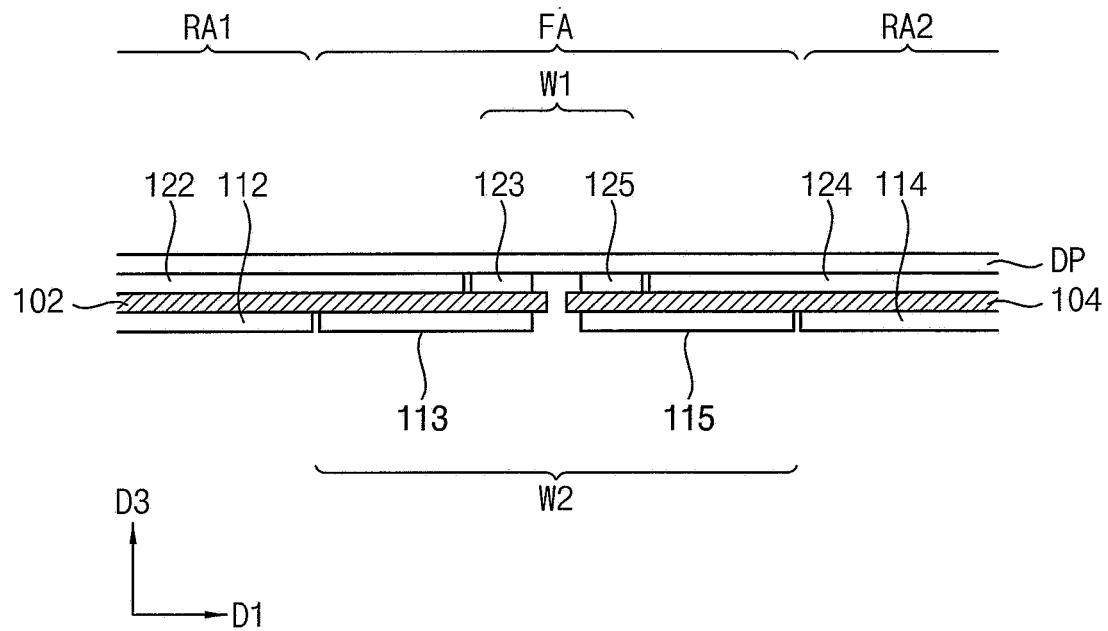
FIG. 8 is an enlarged cross-sectional view illustrating an embodiment of a folding area and an area adjacent thereto, in a display apparatus which is unfolded.

FIG. 8 is an enlarged cross-sectional view illustrating an embodiment of a folding area FA and an area adjacent thereto, in a display apparatus which is unfolded.

Referring to FIG. 8, the display apparatus is substantially the same as the display apparatuses of FIGS. 3 and 4 except for a step compensation layer. Although not shown, the display apparatus may further include a foldable support (see the first support 210, the second support 220 and the central support 230 of FIGS. 1 through 6).

The display apparatus may include a first lower adhesive layer 112, a second lower adhesive layer 114, a first elastic sheet 102, a second elastic sheet 104, a first upper adhesive layer 122, a second upper adhesive layer 124, a display panel DP which is flexible, a first lower step compensation layer 113, a second lower step compensation layer 115, a first upper step compensation layer 123 and a second upper step compensation layer 125.

The first lower step compensation layer 113 and the second lower step compensation layer 115 may occupy a space SP between portions of the foldable support and the elastic members (see FIG. 3) and compensate for steps formed by the first lower adhesive layer 112 and the second lower adhesive layer 114 spaced apart from each other at the lower unattached area, respectively. The first lower step compensation layer 113 and the second lower step compensation layer 115 may be detached from corresponding portions of the foldable support, such that such that the display panel DP is detached relative to the foldable support at planar areas corresponding to the first lower step compensation layer 113 and the second lower step compensation layer 115.

The first upper step compensation layer 123 and the second upper step compensation layer 125 may occupy a gap between portions of the first elastic sheet 102 and the second elastic sheet 104, relative to the display panel DP (see FIG. 3), and compensate for steps formed by the first upper adhesive layer 122 and the second upper adhesive layer 124 spaced apart from each other at the upper unattached area, respectively. The first upper step compensation layer 123 and the second upper step compensation layer 125 may be detached from corresponding portions of the display panel DP.

According to one or more embodiment, since the step compensation layer is provided or formed in one or more unattached area at the folding area FA of the display apparatus, a step difference due to one or more of the adhesive layers relative to other layers within the display apparatus may be minimized.

Figure 9:
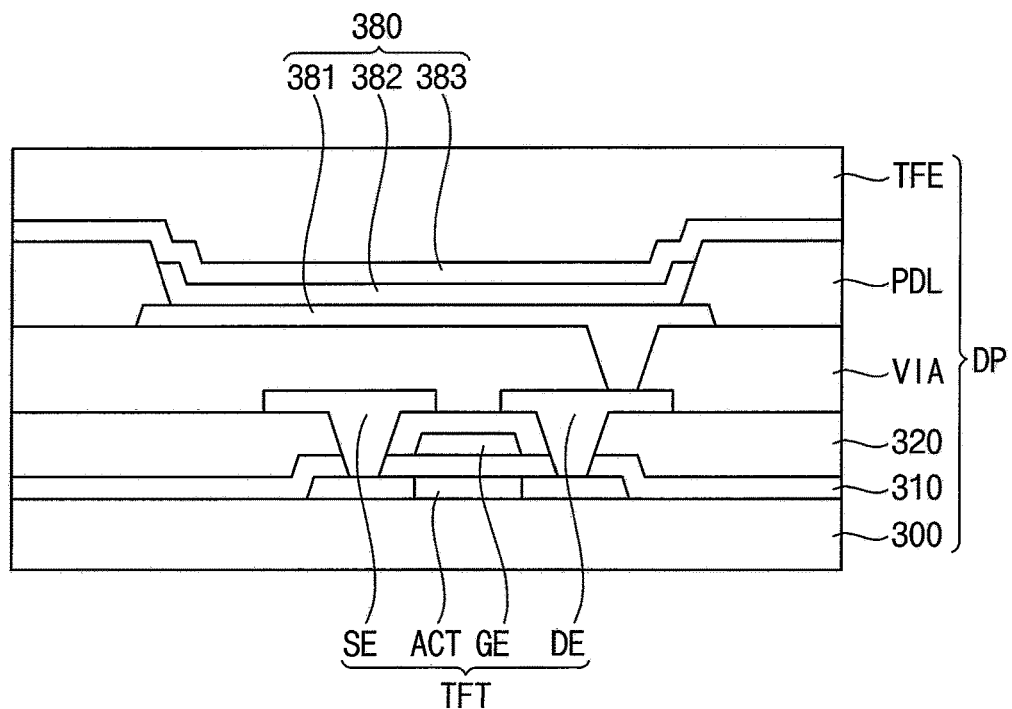
FIG. 9 is an enlarged cross-sectional view illustrating an embodiment of a flexible display panel of the display apparatus of FIG. 3.

FIG. 9 is an enlarged cross-sectional view illustrating a portion of a display panel DP of the display apparatus of FIG. 3.

Referring to FIGS. 9 and 3, the display panel DP may include a flexible substrate 300, a thin film transistor TFT, a first insulating layer 310, a second insulating layer 320, a via insulating layer IVA, a pixel defining layer PDL, a light emitting element 380 (e.g., light emitting structure), an encapsulation layer (e.g., thin film encapsulation layer TFE), and the like. The thin film transistor TFT may include an active pattern ACT, a gate electrode GE, a source electrode SE and a drain electrode DE. The light emitting element 380 may include a first electrode 381, a light emitting layer 382, and a second electrode 383.

A flexible substrate 300 including a transparent or opaque material may be provided. The flexible substrate 300 may be disposed on the first upper adhesive layer 122 and/or second upper adhesive layer 124. The flexible substrate 300 may include or be formed of a transparent resin substrate. An example of the transparent resin substrate that may be used as the flexible substrate 300 includes a polyimide substrate. The polyimide substrate may include a first polyimide layer, a barrier film layer, a second polyimide layer, and the like. In an embodiment, the flexible substrate 300 may include a quartz substrate, a synthetic quartz substrate, a calcium fluoride substrate, a fluorine-doped (F-doped) quartz substrate, a soda-lime glass substrate, a non-alkali glass substrate, and the like.

Within the display panel DP, a buffer layer (not shown) may be disposed on the flexible substrate 300. The buffer layer may reduce or effectively prevent metal atoms or impurities from diffusing into the thin film transistor TFT from the flexible substrate 300. In an embodiment of a method of manufacturing the display panel DP, the buffer layer may allow the active pattern ACT to be have a uniform structure, by adjusting a heat transfer rate during crystallization process for providing or forming the active pattern ACT. In addition, when a surface of the flexible substrate 300 which faces the thin film encapsulation layer TFE is not uniform, the buffer layer may serve to compensate for the nonuniformity and improve the flatness of the surface of the flexible substrate 300. Depending on a material and/or structure of the flexible substrate 300, two or more buffer layers may be provided on the flexible substrate 300 or the buffer layer may be omitted. In an embodiment, for example, the buffer layer may include an organic material or an inorganic material.

The active pattern ACT may be disposed on the flexible substrate 300. The active pattern ACT may include a metal oxide semiconductor, an inorganic semiconductor (such as amorphous silicon and poly silicon), an organic semiconductor, and the like. The active pattern ACT may have a source area, a drain area, and a channel area which is between the source area and the drain area in a direction along the flexible substrate 300.

The first insulating layer 310 may be disposed on the active pattern ACT. In an embodiment, for example, the first insulating layer 310 may cover the active pattern ACT on the flexible substrate 300, and may define a planar upper surface without generating a step around the active pattern ACT. The first insulating layer 310 may be disposed to have a uniform thickness along a profile of the active pattern ACT, while covering the active pattern ACT relative to the flexible substrate 300. The first insulating layer 310 may include a silicon material, metal oxide, and the like. In an embodiment, for example, the first insulating layer 310 may include silicon oxide (SiOx), silicon nitride (SiNx), silicon oxynitride (SiOxNy), silicon oxycarbide (SiOxCy), silicon carbonitride (SiCxNy), aluminum oxide (AlOx), aluminum nitride (AlNx), tantalum oxide (TaOx), hafnium oxide (HfOx), zirconium oxide (ZrOx), titanium oxide (TiOx), and the like. In an embodiment, the first insulating layer 310 may have a multi-layer structure including a plurality of insulating layers. In an embodiment, for example, the insulating layers within the active pattern ACT may have different thicknesses from each other and/or include different materials from each other.

A gate pattern including a gate electrode GE, may be disposed on the first insulating layer 310. The gate pattern may be disposed to overlap the channel area of the active pattern ACT. The gate electrode GE may include a metal material, an alloy, a metal nitride, a conductive metal oxide, a transparent conductive material, and the like. In an embodiment, for example, the gate electrode GE may include gold (Au), silver (Ag), aluminum (Al), tungsten (W), copper (Cu), platinum (Pt), nickel (Ni), titanium (Ti), palladium (Pd), magnesium (Mg), calcium (Ca), lithium (Li), chromium (Cr), tantalum (Ta), molybdenum (Mo), scandium (Sc), neodymium (Nd), iridium (Ir), an alloy including aluminum, aluminum nitride (AlNx), an alloy including silver, tungsten nitride (WNx), an alloy including copper, an alloy including molybdenum, titanium nitride (TiNx), chromium nitride (CrNx), tantalum nitride (TaNx), strontium ruthenium oxide (SrRuxOy), zinc oxide (ZnOx), indium tin oxide ("ITO"), tin oxide (SnOx), indium oxide (InOx), gallium oxide (GaOx), indium zinc oxide ("IZO"), and the like. These may be used individually or in combination. In an embodiment, the gate pattern may include a multi-layer structure including a plurality of metal material layers. In an embodiment, for example, the metal material layers within the gate pattern may have different thicknesses from each other or include different materials from each other.

The second insulating layer 320 may be disposed on the gate pattern. In an embodiment, for example, the second insulating layer 320 may cover the gate pattern on the first insulating layer 310, and may define a planar upper surface without generating a step around the gate pattern. The second insulating layer 320 may be disposed to have a uniform thickness along a profile of the gate pattern, while covering the gate pattern relative to the first insulating layer 310. The second insulating layer 320 may include a silicon material, metal oxide, and the like. The second insulating layer 320 may have a multi-layer structure including a plurality of insulating layers. In an embodiment, for example, the insulating layers within the second insulating layer 320 may have different thicknesses from each other or include different materials from each other.

A data pattern including a source electrode SE and a drain electrode DE of the thin film transistor TFT, may be disposed on the second insulating layer 320. The source electrode SE may be connected to the source area of the active pattern ACT at or through a contact hole provided in the first insulating layer 310 and the second insulating layer 320, such as by removing first portions of material layers for forming the first insulating layer 310 and the second insulating layer 320 in a method of manufacturing the display panel DR The drain electrode DE may be connected to the drain area of the active pattern ACT at or through a contact hole provided in the first insulating layer 310 and the second insulating layer 320, such as by removing second portions of material layers for forming the first insulating layer 310 and the second insulating layer 320 in a method of manufacturing the display panel DR The data pattern may include a metal material, an alloy, a metal nitride, a conductive metal oxide, a transparent conductive material, and the like. These may be used individually or in combination. In an embodiment, the data pattern may have a multi-layer structure including a plurality of metal material layers. In an embodiment, for example, the metal material layers within the data pattern may have different thicknesses from each other or include different materials from each other.

Accordingly, the thin film transistor TFT, which includes the active pattern ACT, the first insulating layer 310, the gate electrode GE, the second insulating layer 320, the source electrode SE and the drain electrode DE, may be provided on the flexible substrate 300.

Although the thin film transistor TFT has been described as having a top gate structure, the invention is not limited thereto. In an embodiment, for example, the thin film transistor TFT may have a bottom gate structure, a double gate structure, or the like.

The via insulating layer VIA may be disposed on the second insulating layer 320 and the data pattern. In an embodiment, for example, the via insulating layer VIA may be disposed to have a relatively large thickness compared to other material layers on the flexible substrate 300 which form the display panel DR The via insulation layer VIA may have a substantially planar upper surface. In order to implement the above-described planar upper surface of the via insulation layer VIA, an embodiment of a method of manufacturing the display panel DP may include a planarization process added to in a process of providing the via insulation layer VIA. The via insulating layer VIA may be disposed to have a uniform thickness along a profile of the data pattern, in a direction along the second insulating layer 320. The via insulating layer VIA may include or be formed of an organic material or an inorganic material. The via insulating layer VIA may include an organic material. In an embodiment, for example, the via insulating layer VIA may include photoresist, polyacryl-based resin, polyimide-based resin, polyamide-based resin, siloxane-based resin, acryl-based resin, epoxy-based resin, and the like.

The first electrode 381 may be disposed on the via insulating layer VIA. The first electrode 381 may be electrically connected to the thin film transistor TFT at or through a contact hole provided in the via insulating layer VIA, such as by removing a portion of a material layer for forming the via insulating layer VIA. The first electrode 381 may include a metal material, an alloy, a metal nitride, a conductive metal oxide, a transparent conductive material, and the like. These may be used individually or in combination. The first electrode 381 may have a multi-layer structure including a plurality of metal material layers. In an embodiment, for example, the metal material layers within the first electrode 381 may have different thicknesses from each other or include different materials from each other.

The pixel defining layer PDL may be disposed on the via insulating layer VIA. In an embodiment, for example, the pixel defining layer PDL may expose a portion of an upper surface of the first electrode 381, while covering both of opposing side surfaces of the first electrode 381. The pixel defining layer PDL may include or be formed of an organic material or an inorganic material. In an embodiment, the pixel defining layer PDL may include an organic material.

The light emitting layer 382 may be disposed on the pixel defining layer PDL and the first electrode 381. The light emitting layer 382 may be provided or formed using a light emitting material capable of emitting a colored light (such as red light, green light, and blue light), different from each other according to display pixels or sub-pixels within a display pixel. The light emitting layer 382 may be provided or formed by laminating a plurality of light emitting materials respectively capable of generating different color light such as red light, green light and blue light, such that white light as a combination of colored light may be emitted at a display pixel or sub-pixel. A color filter (not shown) may be disposed on the light emitting layer 382 corresponding to the first electrode 381. The color filter may include at least one of a red color filter, a green color filter and a blue color filter. The color filter may also include a yellow color filter, a cyan color filter or a magenta color filter. The color filter may include photosensitive resin or color photoresist.

The second electrode 383 may be disposed on the light emitting layer 382 and the pixel defining layer PDL. The second electrode 383 may include a metal material, an alloy, a metal nitride, a conductive metal oxide, a transparent conductive material, and the like. These may be used individually or in combination. The second electrode 383 may have a multi-layer structure including a plurality of layers. In an embodiment, for example, the metal material layers within the second electrode 383 may have different thicknesses from each other or include different materials from each other.

The thin film encapsulation layer TFE may be disposed on the second electrode 383. The thin film encapsulation layer TFE may include at least one inorganic layer and organic layer that are arranged along a thickness direction of the display panel DP In an embodiment, for example, a first inorganic layer, an organic layer on the first inorganic layer, and a second inorganic layer on the organic layer may be included within the thin film encapsulation layer TFE. The thin film encapsulation layer TFE may reduce or effectively prevent deterioration of the light emitting layer 382 due to the permeation of the moisture, oxygen, or the like. In addition, the thin film encapsulation layer TFE may also function to protect the display panel DP from an external impact. In addition, the thin film encapsulation layer TFE may improve the flatness of the display panel DP at a viewing side thereof.

Although the display apparatus has been described as including an organic light emitting display panel, the invention is not limited thereto. In an embodiment, the display apparatus may include a liquid crystal display apparatus ("LCD"), a field emission display ("FED"), a plasma display panel ("PDP") or an electrophoretic display apparatus ("EPD").

Figure 10:
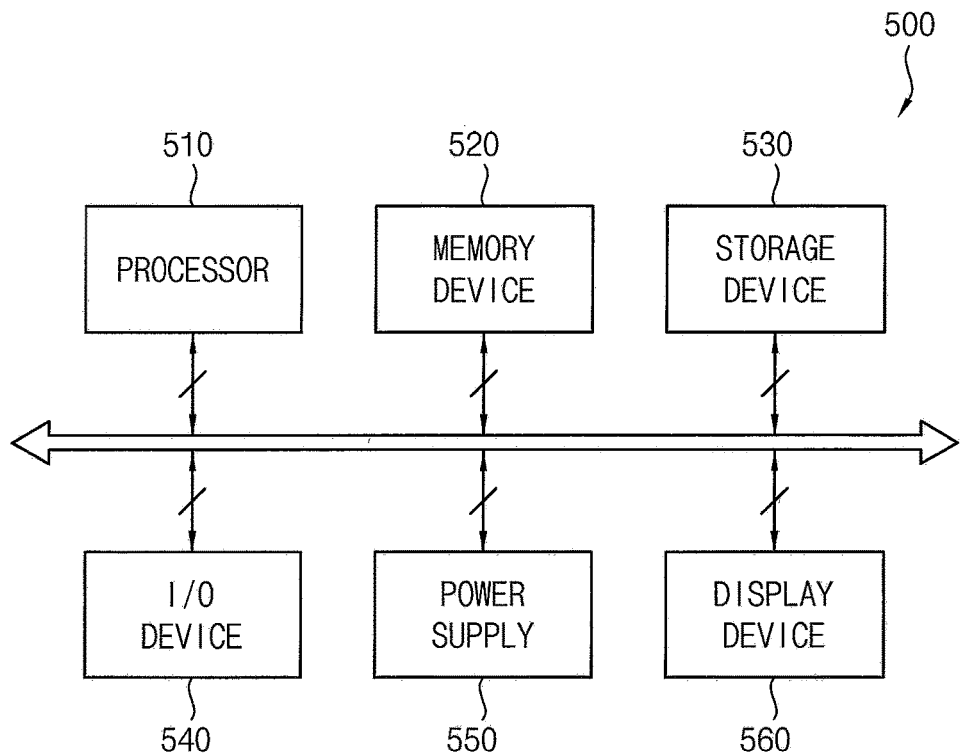
FIG. 10 is a block diagram illustrating an embodiment of an electronic apparatus including a display apparatus.

FIG. 10 is a block diagram illustrating an embodiment of an electronic apparatus including a display apparatus.

Referring to FIG. 10, the electronic apparatus 500 may include a processor 510, a memory device 520, a storage device 530, an input/output ("I/O") device 540, a power supply 550, and a display device 560. Here, the display device 560 may be the display apparatus of FIG. 1. In addition, the electronic apparatus 500 may further include a plurality of ports for electronically and/or physically communicating with a video card, a sound card, a memory card, a universal serial bus ("USB") device, other electronic apparatuses, etc. In an embodiment, the electronic apparatus 500 may be implemented as a smart phone. In another embodiment, the electronic apparatus 500 may be implemented as a television. However, the electronic apparatus 500 is not limited thereto. In an embodiment, for example, the electronic apparatus 500 may be implemented as a cellular phone, a video phone, a smart pad, a smart watch, a tablet personal computer ("PC"), a car navigation system, a computer monitor, a laptop, a head mounted display ("HMD") apparatus, etc.

The processor 510 may perform various computing or operational functions. The processor 510 may be a microprocessor, a central processing unit ("CPU"), an application processor ("AP"), etc. The processor 510 may be coupled to other components via an address bus, a control bus, a data bus, etc. Further, the processor 510 may be coupled to an extended bus such as a peripheral component interconnection ("PCI") bus. The memory device 520 may store data for operations of the electronic apparatus 500. In an embodiment, for example, the memory device 520 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc. and/or at least one volatile memory device such as a dynamic random access memory ("DRAM") device, a static random access memory ("SRAM") device, a mobile DRAM device, etc. The storage device 530 may include a solid state drive ("SSD") device, a hard disk drive ("HDD") device, a CD-ROM device, etc. The I/O device 540 may include an input device such as a keyboard, a keypad, a mouse device, a touch-pad, a touchscreen, etc., and an output device such as a printer, a speaker, etc. The power supply 550 may provide power for operations of the electronic apparatus 500.

The display device 560 may be coupled to other components via the buses or other communication links. In an embodiment, the I/O device 540 may include the display device 560. As described above, the display device 560 may be a display apparatus which is foldable, that can be folded and unfolded. The display device 560 may include elastic sheets disposed between a display panel DP which is flexible, and the foldable support. The display device 560 may minimize an area in which wrinkles occur in the display panel DP which is flexible, due to repeated folding and unfolding, so that visual recognition of the wrinkles is reduced or effectively prevented. Since these are described above, duplicated description related thereto will not be repeated.

One or more embodiment of a display apparatus may be applied to an electronic apparatus 500 including the display apparatus. In an embodiment, for example, one or more embodiment of the display apparatus may be applied to a smart phone, a cellular phone, a video phone, a smart pad, a smart watch, a tablet PC, a car navigation system, a television, a computer monitor, a laptop, a head mounted display apparatus, etc.

The foregoing is illustrative of the invention and is not to be construed as limiting thereof. Although embodiments have been described, those skilled in the art will readily appreciate that many modifications are possible in the embodiments without materially departing from the novel teachings and advantages of the invention. Accordingly, all such modifications are intended to be included within the scope of the invention as defined in the claims. Therefore, it is to be understood that the foregoing is illustrative of various embodiments and is not to be construed as limited to the embodiments disclosed, and that modifications to the disclosed embodiments, as well as other embodiments, are intended to be included within the scope of the appended claims.

What is claimed is:

1. A display apparatus comprising:
a display panel which is foldable at a folding area thereof;
a foldable support which faces the display panel and is foldable together with the display panel;
an elastic sheet which is between the foldable support and the display panel, and extends from between the foldable support and the display panel and into the folding area;
a lower adhesive layer which is between the foldable support and the elastic sheet, and attaches the foldable support to the elastic sheet;
an upper adhesive layer which is between the elastic sheet and the display panel and attaches the elastic sheet to the display panel;
a lower unattached area in which the elastic sheet and the foldable support are unattached to each other within the folding area, the lower unattached area having a width defined along the display panel; and
an upper unattached area in which the elastic sheet and the display panel are unattached to each other within the folding area, the upper unattached area having a width defined along the display panel,
wherein
each of the foldable support, the elastic sheet, the lower adhesive layer and the upper adhesive layer is disconnected at the folding area, and
the width of the lower unattached area is greater than the width of the upper unattached area.

2. The display apparatus of claim 1, wherein the upper unattached area excludes the upper adhesive layer.

3. The display apparatus of claim 2, further comprising in the upper unattached area:
the upper adhesive layer which is disconnected at the folding area, defining a gap between the display panel and the elastic sheet, and
a step compensation layer which is in the gap between the display panel and the elastic sheet.

4. The display apparatus of claim 1, wherein within the upper unattached area:
the upper adhesive layer includes an upper surface facing the display panel,
the upper surface of the upper adhesive layer includes:
an upper unattached planar area which is unattached to the display panel and defines an adhesive strength relative to the display panel, and
an attached planar area which is adjacent to the upper unattached planar area, is attached to the display panel and defines an adhesive strength relative to the display panel, and
the adhesive strength of the upper unattached planar area is weaker than the adhesive strength of the attached planar area.

5. The display apparatus of claim 1, wherein
the foldable support which is disconnected, includes a first support and a second support spaced apart from each other along the display panel, at the folding area,
the display panel which is unfolded disposes the first support and the second support coplanar with each other, and
the display panel which is folded disposes the first support and the second support facing each other.

6. The display apparatus of claim 5, wherein
the display panel includes a first non-folding area corresponding to the first support, and a second non-folding area corresponding to the second support, the first non-folding area and the second non-folding area facing each other with the folding area therebetween, and
the foldable support which is folded together with the display panel, disposes the display panel bent at the folding area.

7. The display apparatus of claim 6, wherein
the elastic sheet which is disconnected, includes a first elastic sheet corresponding to the first non-folding area, and a second elastic sheet corresponding to the second non-folding area and spaced apart from the first elastic sheet along the display panel, at the folding area,
the first elastic sheet includes a first portion corresponding to the folding area and a second portion which is adjacent to the first portion and corresponding to the first non-folding area, and
the foldable support which is folded together with the display panel, disposes the first portion of the first elastic sheet inclined with respect to the second portion of the first elastic sheet.

8. The display apparatus of claim 1, wherein the display panel which is unfolded, defines a space between the foldable support and the elastic sheet, in the lower unattached area.

9. The display apparatus of claim 8, wherein the foldable support includes:
a first support which faces the display panel and is foldable together with the display panel, the first support facing the elastic sheet with the space therebetween, and
a second support in the space between the first support and the elastic sheet, the second support rotatably connected to the first support to rotate within an angle with respect to the first support.

10. The display apparatus of claim 9, wherein the elastic sheet is attached to the foldable support at the second support.

11. The display apparatus of claim 1, wherein the display panel includes:
a first non-folding area, and a second non-folding area facing the first non-folding area with the folding area therebetween,
wherein
the foldable support which is folded together with the display panel, defines a radius of curvature of the display panel at the folding area, and
the width of the upper unattached area is about 10 times or less of the radius of curvature of the display panel.

12. The display apparatus of claim 1, wherein
the foldable support which is disconnected, includes:
a first support and a second support spaced apart from each other along the display panel, at the folding area, and
a central support between the first support and the second support and spaced apart therefrom, at the folding area,
the elastic sheet which is disconnected, includes:
a first elastic sheet corresponding to the first support, and
a second elastic sheet corresponding to the second support and spaced apart from the first support along the display panel, at the folding area,
the display panel which unfolded, disposes the first elastic sheet and the second elastic sheet extended further than a side surface of the first support and the second support, respectively, at the folding area, and
the first elastic sheet and the second elastic sheet which are extended further than the side surface of the first support and the second support, respectively, define ends of the elastic sheet at the folding area which correspond to the central support.

13. The display apparatus of claim 12, wherein the first elastic sheet and the second elastic sheet each comprise a metal sheet having a thickness between about 30 micrometers and about 200 micrometers.

14. The display apparatus of claim 1, wherein the elastic sheet between the foldable support and the display panel, has an elastic modulus between about 5 gigapascals and about 300 gigapascals.

* * * * *